US012378791B2

(12) United States Patent
Grigsby

(10) Patent No.: US 12,378,791 B2
(45) Date of Patent: Aug. 5, 2025

(54) EARTHQUAKE SAFETY PROTECTION DEVICE

(71) Applicant: Timothy Grigsby, Atlanta, GA (US)

(72) Inventor: Timothy Grigsby, Atlanta, GA (US)

( * ) Notice: Subject to any disclaimer, the term of this patent is extended or adjusted under 35 U.S.C. 154(b) by 197 days.

(21) Appl. No.: 17/942,363

(22) Filed: Sep. 12, 2022

(65) Prior Publication Data

US 2023/0003045 A1 Jan. 5, 2023

Related U.S. Application Data

(63) Continuation-in-part of application No. 17/529,062, filed on Nov. 17, 2021, now abandoned, which is a continuation-in-part of application No. 17/391,590, filed on Aug. 2, 2021, now abandoned, which is a continuation-in-part of application No. 17/344,017, filed on Jun. 10, 2021, now abandoned.

(60) Provisional application No. 63/040,284, filed on Jun. 17, 2020.

(51) Int. Cl.
*E04H 9/02* (2006.01)
*E06B 1/04* (2006.01)
*E06B 1/12* (2006.01)

(52) U.S. Cl.
CPC ............. *E04H 9/027* (2013.01); *E04H 9/021* (2013.01); *E04H 9/024* (2013.01); *E04H 9/029* (2013.01); *E06B 1/04* (2013.01); *E06B 1/12* (2013.01)

(58) Field of Classification Search
CPC ......... E04H 9/021; E04H 9/024; E04H 9/027; E04H 9/029; E06B 1/04; E06B 1/12
See application file for complete search history.

(56) References Cited

U.S. PATENT DOCUMENTS

| | | | | |
|---|---|---|---|---|
| 5,295,327 A * | 3/1994 | Dubois | ................... | E06B 3/988 49/504 |
| 5,867,947 A | 2/1999 | Holtz Hale | | |
| 6,178,700 B1 * | 1/2001 | Mayer, Jr. | ................. | E06B 1/52 49/504 |
| 6,389,761 B1 | 5/2002 | McKinnon | | |
| 9,103,163 B2 * | 8/2015 | McCue | ................. | E01F 15/141 |
| 9,316,012 B2 | 4/2016 | Perry | | |
| 2006/0037257 A1 | 2/2006 | Newland | | |

(Continued)

FOREIGN PATENT DOCUMENTS

| | | | | |
|---|---|---|---|---|
| CN | 107916872 A * | 4/2018 | ............... | E06B 1/12 |
| CN | 111764726 A * | 10/2020 | | |

(Continued)

*Primary Examiner* — Jessie T Fonseca
(74) *Attorney, Agent, or Firm* — Gregson IP Law LLC

(57) ABSTRACT

An article of manufacture for an earthquake safety protection device (ESPD) according to the present invention is disclosed. The ESPD consists of an earthquake support pole and mating support members to create survivable space around the support pole should a room be damaged in an earthquake. The ESPD may also comprise a reinforced frame within an interior door of a building. The reinforced frame resists damage from an earthquake that may prevent the interior door from opening. Opening or removal of the inner door protected by the reinforced frame creates a means of safely exiting a room in spite of damage to the interior door and its corresponding door frame. The ESPD may also include a mechanism to prevent a mobile hospital bed from moving about a room during an earthquake.

7 Claims, 5 Drawing Sheets

(56) References Cited

U.S. PATENT DOCUMENTS

| | | | | |
|---|---|---|---|---|
| 2014/0318052 | A1* | 10/2014 | McCue | E06B 1/52<br>52/211 |
| 2019/0145157 | A1* | 5/2019 | Diaz Ferrer | E06B 1/00<br>52/167.1 |

FOREIGN PATENT DOCUMENTS

| | | | | | |
|---|---|---|---|---|---|
| JP | 2006188945 | A | * | 7/2006 | |
| KR | 102188681 | B1 | * | 12/2020 | |
| WO | WO-2011010300 | A2 | * | 1/2011 | E04B 1/161 |
| WO | 2012011514 | | | 1/2012 | |
| WO | WO-2015021569 | A1 | * | 2/2015 | E06B 1/12 |
| WO | WO-2019158823 | A1 | * | 8/2019 | |

* cited by examiner

EARTHQUAKE SAFETY PROTECTION DEVICE

CROSS-REFERENCE TO RELATED APPLICATION

This application claims priority to U.S. patent application Ser. No. 17/529,062, titled "Earthquake Safety Protection Device," and filed on Nov. 17, 2021, which itself claims priority to U.S. patent application Ser. No. 17/391,590, titled "Earthquake Safety Protection Device," and filed on Aug. 2, 2021, which itself claims the benefit of the U.S. patent application Ser. No. 17/344,017, titled "Earthquake Safety Protection Device," and filed on Jun. 10, 2021, which itself claims the benefit of the U.S. Provisional Patent Application No. 63/040,284, titled "Earthquake Safety Protection Device," and filed on Jun. 17, 2020. The entire application is incorporated herein by reference in its entirety.

TECHNICAL FIELD

This application relates in general to an article of manufacture for providing an earthquake safety protection device.

BACKGROUND

People may become trapped within a damaged building following an earthquake. Depending upon the severity of the earthquake, significant damage may occur to a building in the earthquake zone that may result in walls and ceilings collapsing and trapping victims within the building. The damaged walls and ceilings typically fall onto individuals causing injuries. Damage to the walls and ceilings may also prevent inner doors from opening creating further obstacles to a safe escape from a damaged building.

The present invention attempts to address existing building designs according to the principles and example embodiments disclosed herein. The earthquake safety protection device attempts to create survivable space within a building that preserves areas in which people may remain unharmed from falling debris. The present invention also attempts to allow victims of an earthquake to safely exit a building with damage to interior doors that prevents the doors from opening.

SUMMARY

In accordance with the present invention, the above and other problems are solved by providing an article of manufacture for an earthquake safety protection device (ESPD) according to the present invention. The ESPD consists of a support pole and mating support members to create survivable space around the support pole should an interior area be damaged in an earthquake. The ESPD may also comprise a reinforced frame within an interior door of a building. The reinforced frame resists damage from an earthquake that may prevent the interior door from opening. Opening or removal of the inner door protected by the reinforced frame creates a means of exiting an area in spite of damage to the interior door and its corresponding door trim. The ESPD may also include a mechanism to restrain a hospital bed from moving about a room or overturning during an earthquake.

In one embodiment, the earthquake safety protection device includes one or more top structural support members, a pair of vertical structural support members coupled to one of the one or more top structural support members creating an opening in a wall, two or more vertical structural support members between each of the one or more top structural support members, and an in-ground anchor coupled to a bottom end of each of the pair of vertical structural support members.

In other aspect of the present invention, the the pair of vertical structural support members are coupled to vertical sides of a door frame supporting a door between spaces of a building.

In another aspect of the present invention, the door frame is made of steel and is present on both sides and a top side of the door frame.

In another aspect of the present invention, the one or more top structural support members comprise a top structural support member and a second structural support members.

In another aspect of the present invention, the one or more top structural support members further comprise additional horizontal structural support members perpendicular to the opening between the pair of vertical structural support members.

In another aspect of the present invention, a metal plate is coupled on a top side of the horizontal structural support members over the opening in the wall.

In another aspect of the present invention, components of the earthquake safety protection device are made of steel that are welded together.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
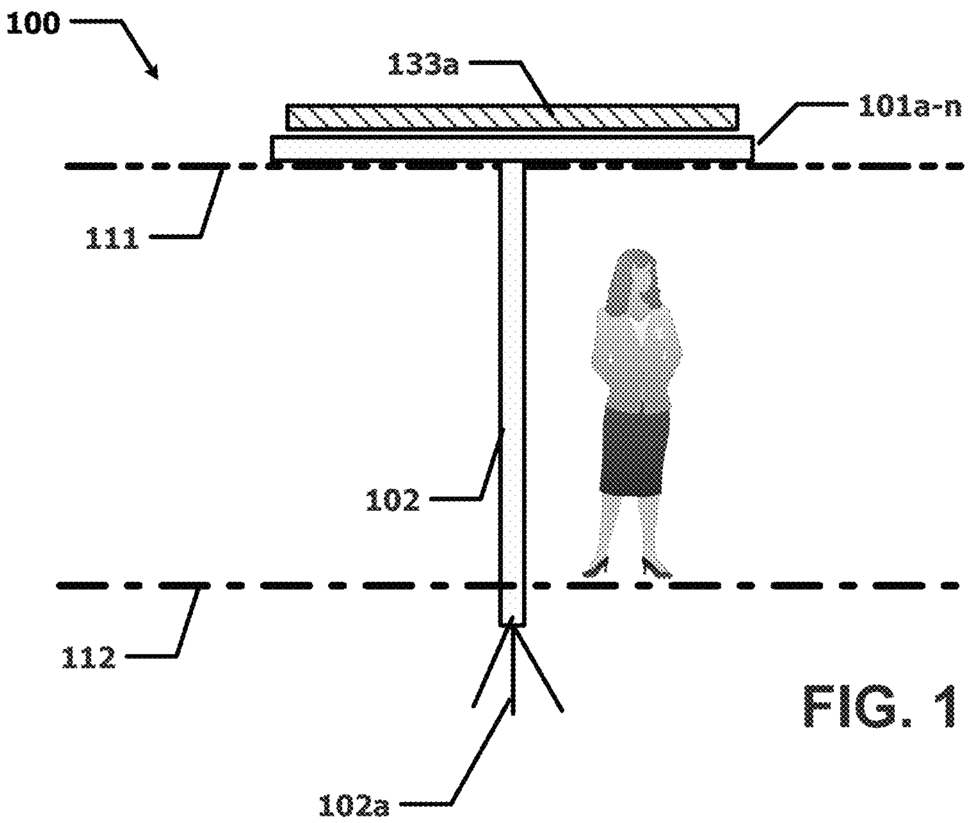
FIG. 1 illustrate one potential embodiment of an article of manufacture for an earthquake safety protection device (ESPD) according to the present invention.

This application relates in general to an article of manufacture for an earthquake safety protection device (ESPD).

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components but do not preclude the presence or addition of one or more other features, steps, or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes and other quantities and characteristics are not and need not be exact but may be approximated and/or larger or smaller, as desired, reflecting tolerances, conversion factors, rounding off, measurement error and the like and other factors known to those of skill. Further, unless otherwise stated, the term "about" shall expressly include "exactly."

The terms "user" and "victim" refer to an entity, e.g., a human, who is protected by an earthquake safety protection device (ESPD) according to the present invention. In a particular case, the user is one that is located within a building or other built space during an earthquake. For such a user, the terms user and victim may be used herein interchangeably.

FIG. 1 illustrates one potential embodiment of an article of manufacture for an earthquake safety protection device (ESPD) according to the present invention. FIG. 1 shows a front view of a living or working space 100 in a building that uses the ESPD according to the present invention. An earthquake support pole 102 is placed between a floor 112 and a ceiling structure 111 to create survivable space 100 within a building. The earthquake support pole 102 is coupled to a plurality of support members 101*a-n* at the top end of the support pole. These plurality of support members 101*a-n* are also coupled to the ceiling structure 111.

The earthquake support pole 102 typically has dimensions that are long enough to run from a ceiling structure 111 to the floor 112. The plurality of support members 101*a-d* may be coupled to the pole mechanically using fasteners such as nuts and bolts, a weld if the plurality of support members 101*a-d* and the earthquake support pole 102 are made of weldable metal, and other coupling techniques such as forging the pole and support members into a single structure. The plurality of support members 101*a-d* and the earthquake support pole 102 may be made of steel or other metals, wood, or other synthetic materials that provide sufficient strength to maintain space around the support pole when an earthquake has caused damage to the building.

Figure 2:
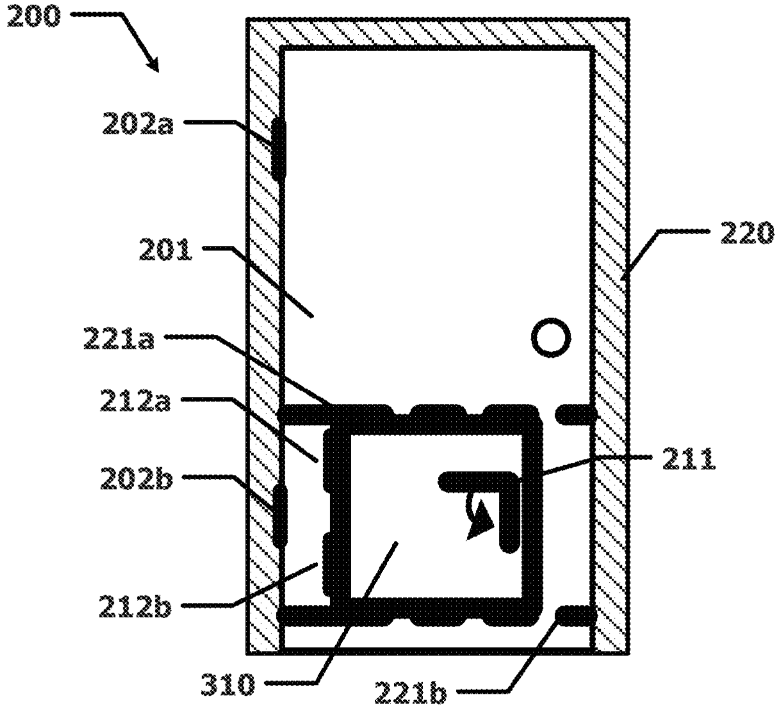
FIG. 2 illustrates yet another potential embodiment of an article of manufacture for an ESPD according to the present invention.

FIG. 2 illustrates yet another potential embodiment of an article of manufacture for an ESPD according to the present invention. In this embodiment, an earthquake escape structure 200 is constructed within an interior door within a building. The earthquake escape structure 200 comprises an inner egress door 310 located within a reinforced inner frame 203. The reinforced inner frame 203 may be constructed of metal or wood and has a thickness to increase the likelihood that the frame will remain intact even when the interior egress door 201 and the reinforced frame 220 forming a door jamb and/or hinges 202*a-b* are damaged in an earthquake.

Should the space within the building around the door 201 be damaged, the interior egress door may not safely open. If victims are located within living space behind the damaged interior egress door, these victims may be trapped in the building until they can be rescued. When the interior egress door 201 contains an earthquake escape structure 300, individuals may open the inner egress door 210 and pass through the inner reinforced frame 203. The inner egress door 210 may be coupled to the reinforced inner frame 203 using hinges 212*a-b* and accessed by rotating a locking handle 211 within the inner door 210. In alternate embodiments, the inner door 210 may be secured within coupling tabs in place of hinges that permit the entire inner door 210 to be removed from the reinforced frame 203 once the locking handle 211 is disengaged.

The interior egress door 201 may also be enclosed in a solid steel reinforced frame 210 in order to reinforce the space containing the door 201 as well as the inner door 310 and its inner reinforced frame 203. The inner reinforced frame may be coupled to the reinforced frame 210 when the interior egress door 201 is closed by one or more cross members 221*a-b*.

Figure 3:
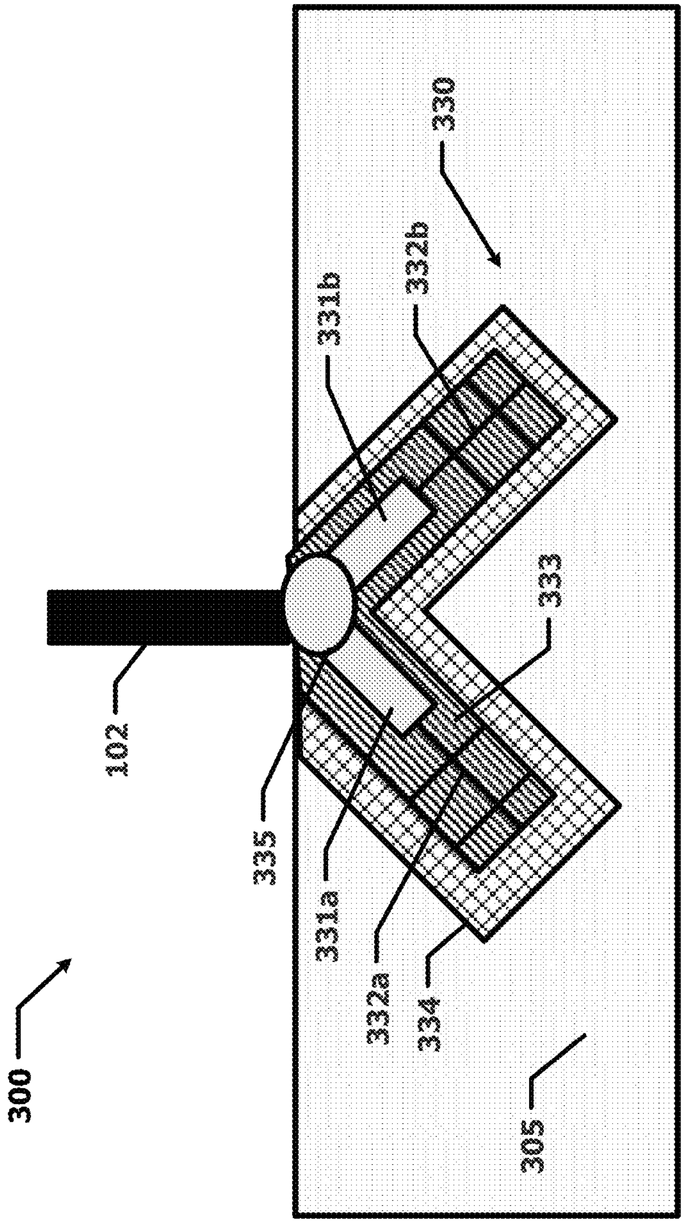
FIG. 3 illustrates a potential embodiment of an in-ground anchor used in an article of manufacture for an ESPD according to the present invention.

FIG. 3 illustrates a potential embodiment of an in-ground anchor 300 used in an article of manufacture for an ESPD according to the present invention, This in-ground anchor 300 may be utilized with the ESPD disclosed herein in reference to FIGS. 1-2 while having a more complex anchor structure 310*c* in the ground 305. The complex anchor structure 330 comprises a plurality of anchor arms 331*a-b* radiating out from a center location 335, each of which has a plurality of energy absorbing cross-members 332*a-b*, all of which are within a central layer 333. The energy absorbing cross-members 332*a-b* works with along with the central layer 333 to dissipate the shaking energy of the building 330. The central layer 333 may be an air filled cavity or alternatively a cavity filled with a thick material having a semi-fluid consistency to slow down the motion of the energy absorbing cross-members 332*a-b*. The entire complex anchor structure 330 may be encased within concrete 334 to form the base of the structure. Alternate example embodiments for in-ground anchors are disclosed in detail in the commonly owned and currently pending related U.S. patent applications referenced above.

Figure 4A:
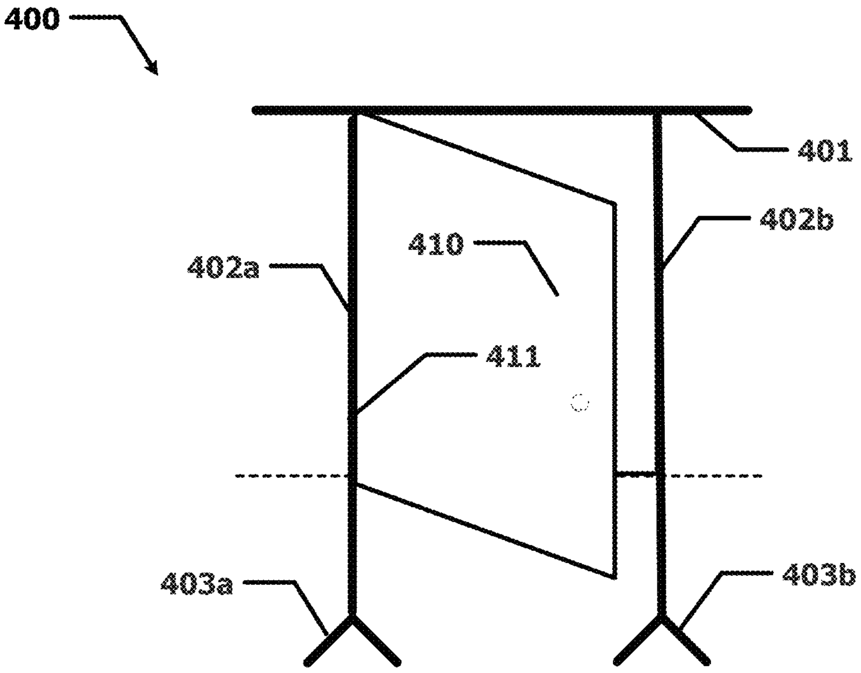
FIGS. 4*a-b* illustrate an example embodiment of a door frame based ESPD in a building according to the present invention.
Figure 4B:
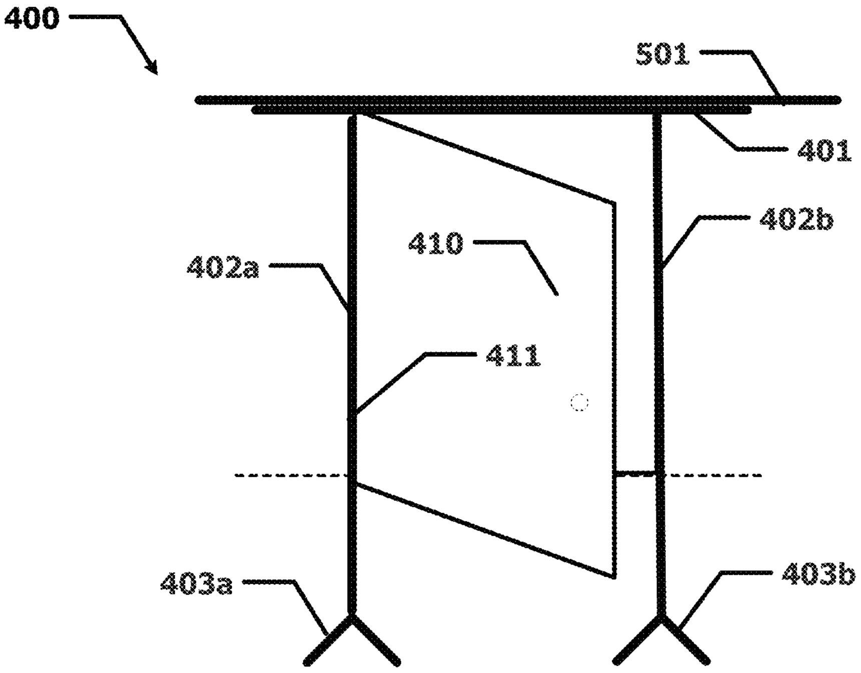

FIGS. 4*a-b* illustrate an example embodiment of a door frame based ESPD in a building according to the present invention. The ESPD devices of FIGS. 1-2 provide differing approaches to providing reinforcement of internal space of a building to create a survival cavity from earthquake caused building damage. The embodiment of FIG. 1 attempts to create a larger survival cavity for supporting individuals within this space when an earthquake occurs. The embodiment of FIG. 2 provides larger amounts of structural reinforcement to the creation of the survival cavity by utilizing door frames existing within buildings to create multiple structural reinforcement members between a ceiling and a floor.

The example embodiment of the ESPD device 400, shown in both FIGS. 4*a-b*, combines these components into a single ESPD device 400. The ESPD device 400 comprises one or more top structural support members 101*a-n* coupled to a door frame 411 about an existing door 410 and a pair of vertical structural support members 402*a-b* coupled to each side of the door frame 401. The multiple vertical support members 402*a-b* combine with the one or more top structural support members 101*a-n* to create the survival cavity about the space of the door frame 401.

The pair of vertical structural support members 402*a-b* are anchored into the ground surface using a corresponding in-ground anchor 403*a-b*. These anchors 403*a-b* secure the vertical structural support members 402*a-b* in place allowing the one or more top structural support members 101*a-n* to be coupled in between creating the survival cavity in between. These anchors 403*a-b* may include any anchoring mechanism as disclosed herein and within the commonly owned and pending patent applications referenced above.

FIG. 4*a* shows the single ESPD device 400 using just the door frame 401 to support the creation of the survival cavity. FIG. 4*b* shows the single ESPD device 400 with an addition of a second horizontal structural support member 501 as disclosed below in reference to FIG. 5.

Figure 5:
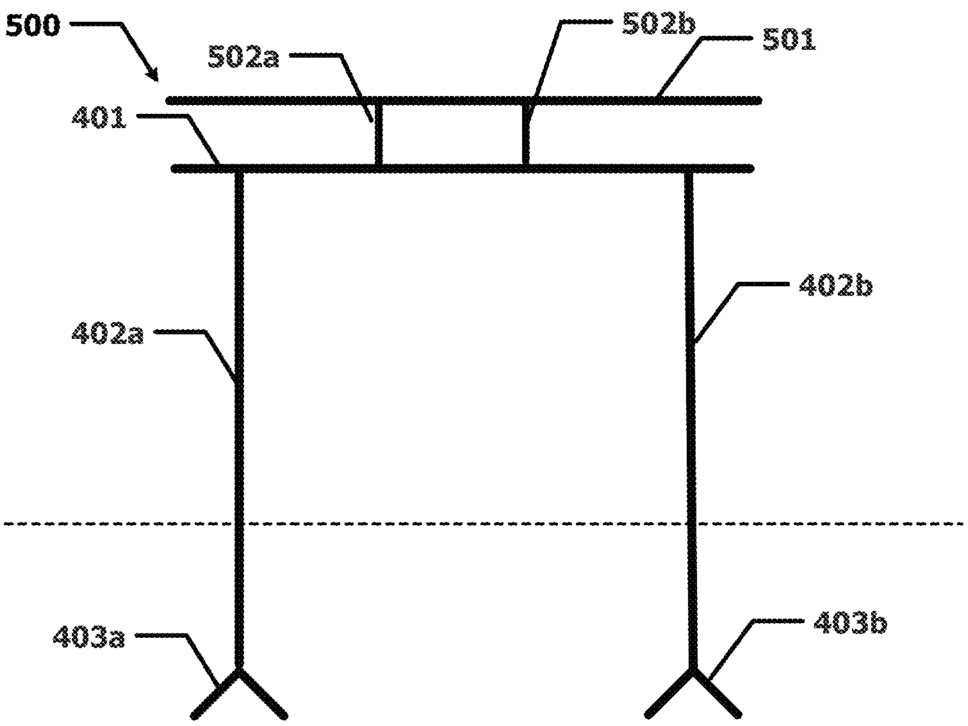
FIG. 5 illustrates another example embodiment of a door frame based ESPD in a building according to the present invention.

FIG. 5 illustrates another example embodiment of a door frame-based ESPD in a building according to the present invention. FIG. 5 shows a second horizontal structural support member 501 coupled to a pair of vertical connecting members 502*a-b* coupled to a top side of the top structural support member 401. The second horizontal structural support member 501 is separated from the top structural support member 401 attached to the door frame 411 by the pair of the pair of vertical structural support members 402*a-b* creating a crushing zone of absorbing damages falling from above that will lessen the forces applied to the top structural support member 401 that is over the survival cavity.

The horizontal structural support member 501 may also include one or more horizontal structural support member being separated by a pair of vertical connecting members creating a stacked structure. In a preferred embodiment, the top structural connecting member and the second horizontal support members are used. Inclusion of additional one or more structural support members 601*a-h* as disclosed in reference to FIG. 6 below may be coupled on top of the ESPD device 400, 500 as desired.

Additionally, the particular opening may comprise an entranceway or similar opening in a wall between rooms that does not include a door. In this example embodiment, a wider opening is shown having the pair of vertical structural support members 402*a-b* and the horizontal structural support member 501 coupled to a pair of vertical connecting members 502*a-b* coupled to a top side of the top structural support member 401. The opening also may be of varying widths with the survival cavity being formed within the opening in the wall as discussed above with reference to FIG. 4.

Figure 6:
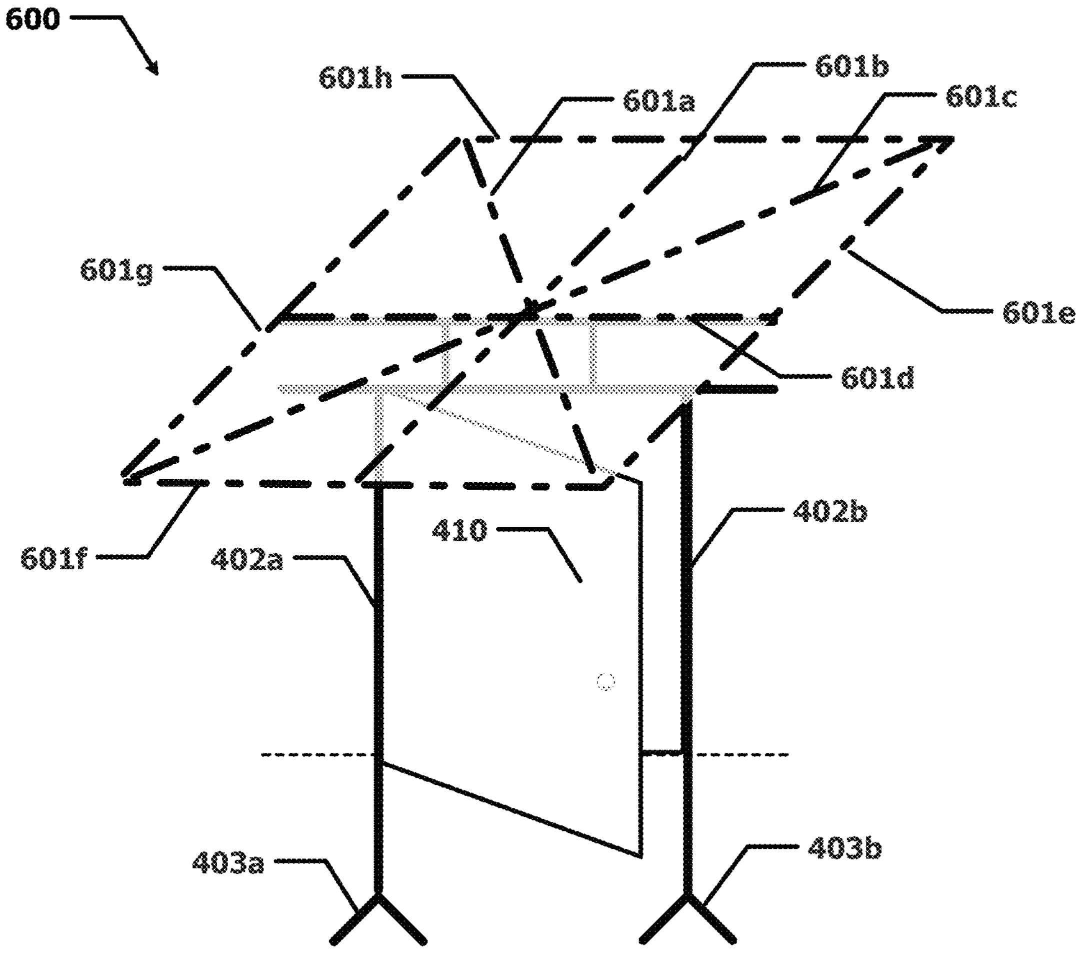
FIG. 6 illustrates another embodiment of the one or more horizontal structural support members according to the present invention.

FIG. 6 illustrates another embodiment of the one or more horizontal structural support members according to the present invention. The prior embodiments of FIGS. 4-5 are shown as a front view of the ESPD device 400, 500 in which the top structural support member 401 is shown being positioned across the top of the door frame 411 and parallel to the door-door frame 410-411. The top structural support member 401 may comprise one or more structural support members 601*a-h* arranged in a pattern that is centered upon the door frame 411 and extending outward. These additional one or more structural support members 601*a-h* assist in enlarging the survival cavity outward from under the door frame 411. Other materials such as metal plates may be coupled on top of the one or more structural support members 601*a-h* to prevent debris from falling into the survival cavity underneath. The one or more structural support members 601*a-h* may be arranged in various patters that extend from either or both sides of the door frame 411 as needed depending upon the arrangement of space about the door 410 and door frame 411.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The invention claimed is:

1. An earthquake safety protection device within a habitable space having a ceiling and a floor, the earthquake safety protection device comprises:

one or more top structural support members;

a pair of vertical structural support members coupled to one of the one or more top structural support members creating an opening in a wall;

two or more vertical structural support members coupled to each of the one or more top structural support members; and an in-ground anchor coupled to a bottom end of each of the pair of vertical structural support members, the in-ground anchor comprises a plurality of anchor arms (331*a-b*) radiating out from a center location, each of which has a plurality of energy absorbing cross-members, all of which are within a central layer.

2. The earthquake safety protection device according to claim 1, wherein the pair of vertical structural support members are coupled to vertical sides of a door frame supporting a door between spaces of a building.

3. The earthquake safety protection device according to claim 2, wherein the door frame is made of steel and is present on opposing sides and top side of the door frame.

4. The earthquake safety protection device according to claim 1, wherein the one or more top structural support members comprises a top structural support member and a second structural support member.

5. The earthquake safety protection device according to claim 1, wherein the one or more top structural support members further comprises additional horizontal structural support members perpendicular to the opening between the pair of vertical structural support members.

6. The earthquake safety protection device according to claim 5, wherein a metal plate is coupled on a top side of the horizontal structural support members over the opening in the wall.

7. The earthquake safety protection device according to claim 6, wherein the top structural support members, the vertical structural support members, and the in-ground anchor of the earthquake safety protection device are made of steel that are welded together.

* * * * *